March 1, 1966 O. H. THOMPSON 3,237,721
MILK HANDLING SYSTEM
Filed Dec. 2, 1963 2 Sheets-Sheet 1
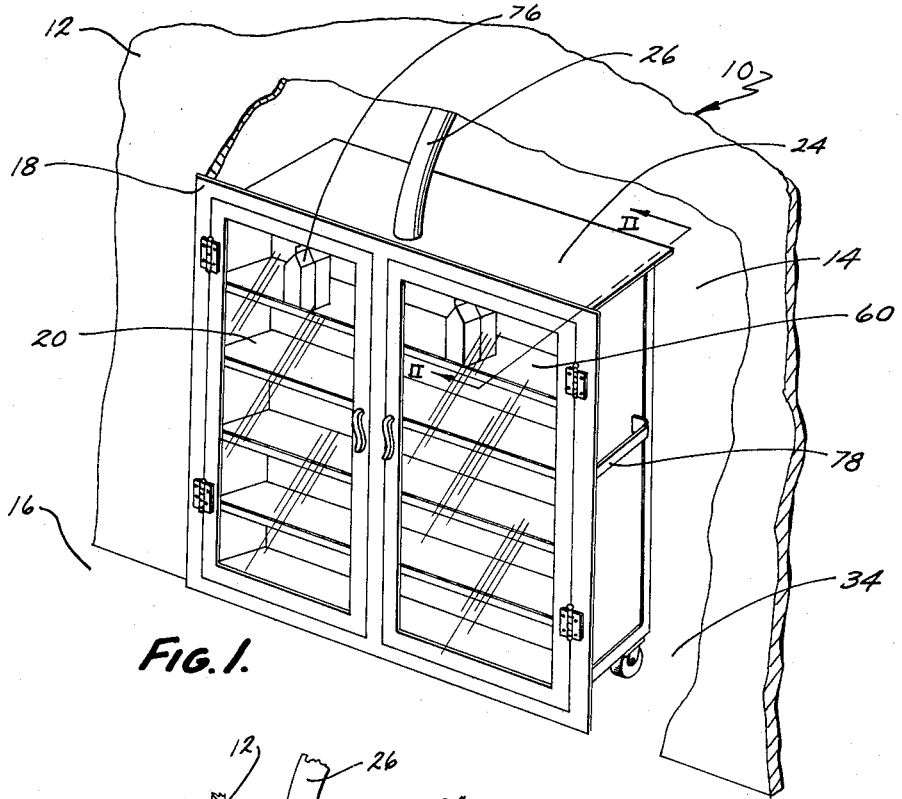
FIG. 1.
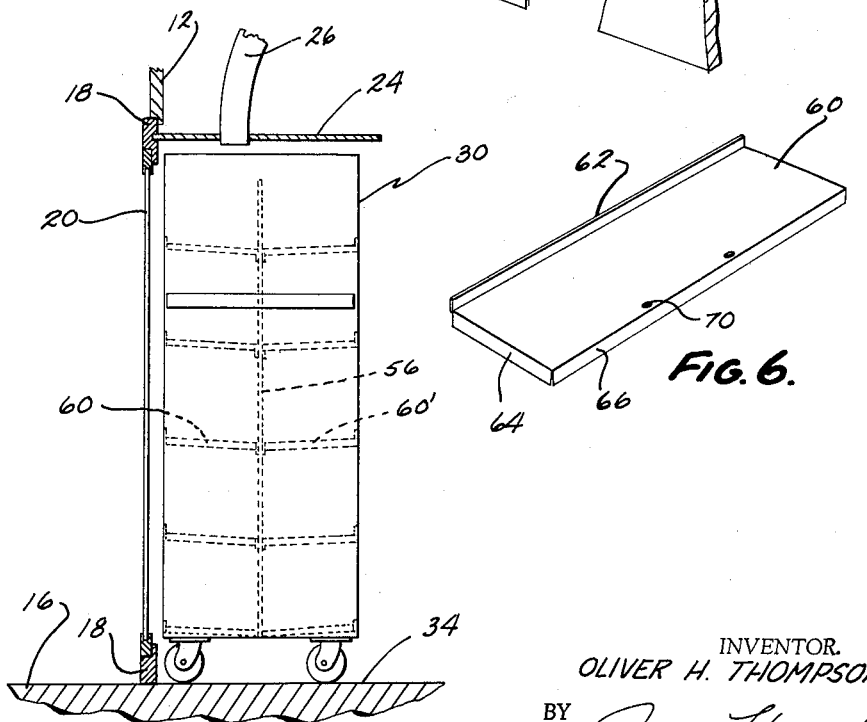
FIG. 2.
FIG. 6.
INVENTOR.
OLIVER H. THOMPSON
BY Price & Heneveld
ATTORNEYS March 1, 1966

O. H. THOMPSON 3,237,721

MILK HANDLING SYSTEM

Filed Dec. 2, 1963

INVENTOR.
OLIVER H. THOMPSON
BY
*Price & Heneveld*
ATTORNEYS

United States Patent Office 3,237,721
Patented Mar. 1, 1966

3,237,721
MILK HANDLING SYSTEM
Oliver H. Thompson, 716 Cherry Ave., Big Rapids, Mich.
Filed Dec. 2, 1963, Ser. No. 327,385
7 Claims. (Cl. 186—1)

This invention relates to a method, an apparatus, and a system for hauling and merchandising containers of milk, and more particularly to apparatus and system of handling, hauling, cooling, and displaying cartons of milk from the dairy to the store to the store customers.

Conventionally, milk cartons filled in the dairy are transported to the store by hauling them in crates. The filled crates in the dairy are first lifted onto suitable conveyance equipment to transport them out of the dairy. They are then hoisted onto trucks and delivered to the store. The crates are then lifted off the trucks and placed on conveying equipment to transport them into the store. They are then lifted off the conveyor and the cartons are each removed from the crates and placed on display shelves in the store cooler for removal by customers. Obviously, this process of hauling and merchandising employs a considerable number of personnel and requires a considerable outlay of equipment. These add considerably to the costs of the dairy owner and store owner. These costs are recouped by setting the consumer price of the milk at a higher value.

It is an object of this invention to provide a method, apparatus, and system of handling, hauling, cooling, and displaying cartons of milk that actually eliminate the need for expensive conveying equipment at the dairy and at the store. It moreover eliminates the manual handling of crates at the dairy or at the store. The method and apparatus further eliminates even the crates themselves.

It is another object of this invention to provide a system of handling milk that enables a plurality of like vehicles to receive the milk cartons in the dairy, convey the cartons to a truck, convey the milk into the store, store the milk in the cooler, and display the milk in the cooler for customer removal. The system employs a plurality of the novel vehicles as integral components of the system since the vehicles each cooperate with the cooler and display system and thereby substantially lessen labor and equipment inventory.

These and several other objects of this invention will become apparent upon studying the following specification in conjunction with the drawings in which:

FIG. 1 is a perspective cutaway view showing the novel system in operation;

FIG. 2 is a side elevational sectional view of the apparatus in FIG. 1;

FIG. 6 is a perspective view of one shelf of the vehicle.

Figure 3:
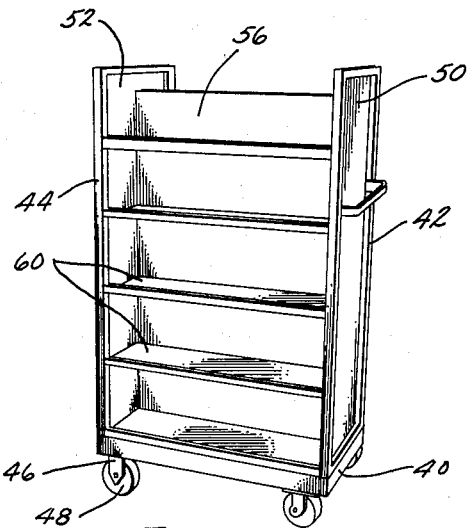
FIG. 3 is a perspective view of one of the plurality of vehicles employed in this system.
Figure 4:
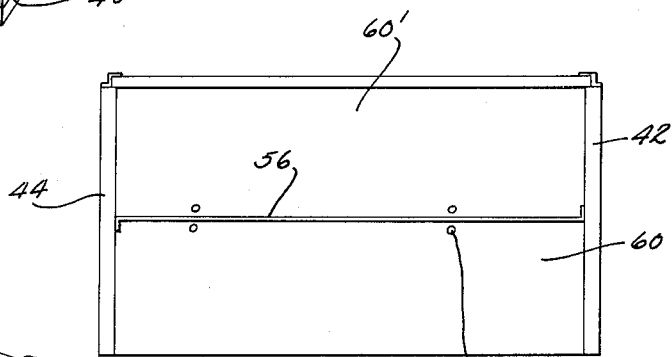
FIG. 4 is a plan view of one form of the vehicle.

Referring now specifically to the drawings the complete system or combination 10 is shown in a store having an inner wall 12 dividing a cooler and display room 14 from the main customer area 16. This wall 12 includes an access opening here shown to be encased by a door casing 18, and closed by a pair of hinged doors 20 of conventional type. Conceivably these doors need not be used, since the cooler can have an open front in some circumstances. Extending rearwardly from casing 18, as illustrated in FIG. 2, is an overhead enclosure panel 24 arranged generally horizontally in cantilever fashion. It extends substantially the length of the access opening in wall 12, and rearwardly sufficiently to cover one of the vehicles 30 employed in combination with the system.

This panel serves to direct and retain the cooling air passing down through a conduit 26 through the panel and adjacent the upper portion of the vehicle.

The floor surface 34 of the cooler area, immediately behind the access opening, is unobstructed, allowing convenient movement of each vehicle 30 to a position immediately behind the access opening within easy reach of a customer standing on front floor portion 16. This area may be a portion of the main store cooler or a smaller special area for display.

Each plurality of vehicles 30 employed in the system includes a framework including a base 40 (FIG. 3) of tubular peripheral stock, and upstanding end frames 42 and 44 of rigid tubular stock arranged in rectangular outline. Supported beneath the four corners of the base are swivel-type caster wheel brackets 46 and caster wheels 48 to rollably support the vehicle.

The two ends of the elongated cart include sheet metal closure panels 50 and 52 attached respectively to frames 42 and 44 to confine the space therebetween. A plurality of support shelves are supported between the sheet elements and frame elements. In the preferred form of the invention as illustrated, the vehicle includes shelves on both sides of a vertically extending, central sheet metal panel 56 which extends down through the center, endwise of the vehicle. It will be understood that in some instances the shelves may extend clear across the depth of the cart from front-to-back with panel 56 being adjacent one side edge of the cart. The structure as shown is preferred since it enables the vehicle to be turned front-to-back when the shelves are emptied on one side, enabling it to be emptied from the opposite side for maximum reaching convenience to the customer, coupled with maximum hauling capacity.

In the form of the invention illustrated, each of the shelves 60 (FIG. 6) includes a main horizontally extending rectangular body portion for supporting milk cartons. It also includes an upstanding front flange 62 for retention purposes, and downwardly extending end flanges and rear flanges 64 and 66 for attachment to the sheet metal panels. Each of the front shelves 60, as well as the rear shelves 60', includes a plurality of drain openings 70 at the back side thereof. Each shelf is slanted slightly downwardly toward the rear, as illustrated in FIG. 2, to cause any moisture condensing on the cartons to drain out the rear of the shelf. Each shelf is capable of supporting a plurality of milk-filled cartons 76. Conceivably, these shelves can be formed of a mesh material rather than a solid sheet metal material.

Mounted on at least one end of the cart is an elongated handle 78 to enable the cart to be moved from place to place.

Preferably, the back side of the vehicle has a channel construction which includes a pair of side elements 84 and 86 forming a receiving bracket, and a bottom support element 88. A rectangular baffle panel 90 can be lowered into this channel and supported on the bottom element to form a back removable enclosure wall for the structure. Both this wall and center panel 56 cooperate with end panels 50 and 52 to control and retain the flow of cooling air down over the shelves and cartons thereon.

Figure 5:
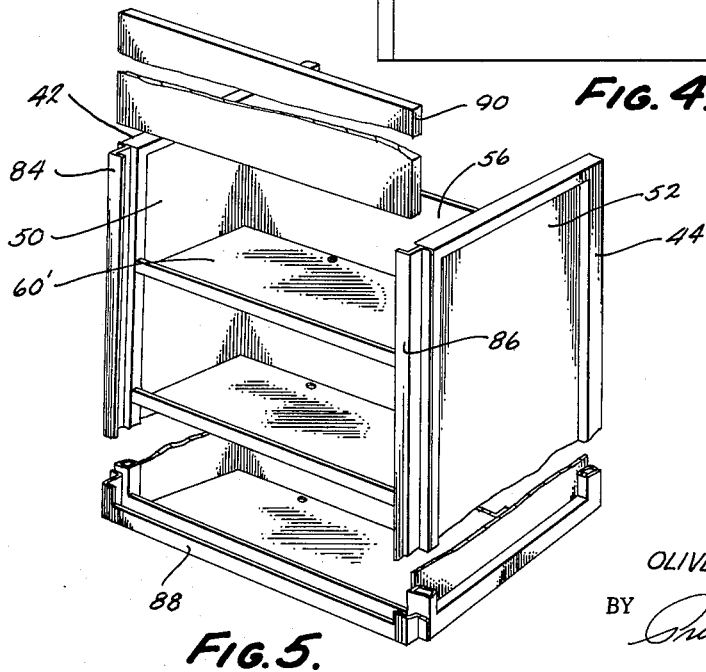
FIG. 5 is a fragmentary enlarged perspective view of the vehicle in FIGS. 3 and 4.

In operation of the system, a plurality of the vehicles are employed between the dairy and the store. At the dairy, the milk cartons 76 are loaded on the shelves 60 and 60' to fill the vehicles. The vehicles are then manually wheeled out of the dairy and onto a truck to be hauled to the selected stores. They are wheeled off the truck and into the store cooler. Then, one at a time, the vehicles are wheeled adjacent the access opening behind doors 20 of the inner store wall 12, and underneath the horizontal baffle plate 24 where the cooling duct 26 emerges. Preferably, the back panel 90 has been inserted in channel elements 84 and 86 as in FIG. 5.

Cooling air flowing down through conduit 26 is conducted down around the cartons within the confines of the end panels and the center panel for the front shelves, and the end panels and back panel 90 for the rear shelves. Customers have access to the milk directly from the cart by merely reaching through the access opening and removing cartons as necessary. The cart presents an attractive display unit, especially when formed of stainless steel or the like. The wheels are normally hidden from view behind the lower wall edge. When the side of the cart adjacent the door becomes empty, the handle 78 is merely grasped by a store clerk and the cart is turned front-to-back. The panel 90 is removed so that rear shelves 60' are available for removal of the milk. When the cart is completely empty it is wheeled away for replacement by another full cart. The empty carts are loaded onto a truck and taken back to the dairy where they are sterilized and refilled.

To those dealing with this art, this system will appear in all of its advantages as truly unique. It eliminates most of the manual labor, and an array of equipment presently necessary. Thus it lowers the costs of milk considerably. Additional advantages to those specifically recited will of course also be apparent to those in the art. Further, certain minor structural modifications could be made in the components of the combination system described while employing the unique concept set forth. Consequently, these modified components, if within the concept of the invention taught, are deemed to be part of this invention, which is to be limited only by the scope of the appended claims.

I claim:

1. A milk handling, hauling, and merchandising system comprising: a store cooler area behind a wall panel inside the store, including an access opening for customer access to milk cartons; cooling duct means in said area adjacent said opening; said area including smooth conveyance floor surface adjacent said opening to receive wheeled hauling and display vehicles; a plurality of wheeled hauling and display vehicles in said cooler area, with one vehicle being temporarily on said conveyance floor surface adjacent said opening; each of said vehicles including frame means, a plurality of vertically spaced support shelves, and vertical panel means for retaining cooling air flow over said shelves; and said vehicles being capable of receiving milk cartons at a dairy, of supporting said cartons to the store, of retaining said cartons in the store cooler, and of displaying said cartons adjacent the access opening of the cooler for sale.

2. A combined unit forming a hauling cart, carton support structure, and a merchandising unit comprising: in a wall inside a store, having an access opening and cooling air outlet means, milk carton support and display means behind said opening, including a plurality of vertically spaced shelves, a pair of enclosing end panels attached to said shelves, an enclosing back panel attached to said shelves and to said end panels to retain cool air around said shelves; frame means supporting said shelves and panels; rolling wheels mounted beneath said frame means and rollably supporting said unit, whereby said unit can be used to receive milk directly in a dairy before positioning behind said opening.

3. A combined milk handling system comprising: a wall inside a store, having an access opening, rearwardly protruding baffle means above said opening, and including a cool air outlet therein, milk carton support and display means behind said opening, including a plurality of vertically spaced shelves, a pair of enclosing end panels attached to said shelves, an enclosing back panel behind said shelves and joining said end panels to retain cool air around said shelves; frame means supporting said shelves and panels; rolling wheels mounted beneath said frame means and rollably supporting said unit, whereby said unit can be used to receive milk directly in a dairy before positioning behind said opening; said end panels and back panel having upper edges terminating just short of said rearwardly protruding means to cause cooling air to flow downwardly around said shelves within said panels.

4. The unit in claim 3 wherein each of said shelves is tilted downwardly slightly toward said back panel, and each includes a frontal carton retention flange.

5. The unit in claim 4 wherein each of said shelves includes drainage opening means on its rear edge adjacent said back panel.

6. A method of handling and merchandising milk comprising the steps of: providing a wheeled, shelved, cart having a vertical panel adjacent the back of the shelves; loading cartons of milk on the shelf at a dairy; wheeling the cart of milk cartons onto a hauling vehicle; hauling the cart and milk to a retail store; wheeling the cart and milk off the vehicle and into the store; positioning the cart behind an access opening in a wall inside the store and passing cool air down over the milk on the shelves while retaining the cool air in the vicinity of the milk by employing the vertical panel as a fluid retaining wall; and causing the cart and milk to remain in such position for removal of the milk by store customers in front of the inside wall in the store through the access opening.

7. A method of handling and merchandising milk comprising the steps of: providing a wheeled, shelved, cart having a vertical panel adjacent one side of the shelves; loading cartons of milk on the shelf at a dairy; wheeling the loaded cart onto a hauling vehicle; hauling the loaded cart to a retail store; wheeling the loaded cart off the vehicle and into the store; positioning the cart behind an access opening in a wall inside the store; causing the cart and milk to remain in such position for removal of the milk by store customers from in front of the inside wall through the access opening, and passing cool air down over the milk on the shelves while retaining the cool air in the vicinity of the milk by employing the vertical panel as a fluid retaining wall; and removing the cart, when empty of milk cartons, for replacement by another loaded cart; returning the empty cart to a dairy; sterilizing the cart, and refilling the cart with new cartons of milk.

References Cited by the Examiner

UNITED STATES PATENTS

| 1,058,606 | 4/1913 | Lantague | 62—255 |
| 2,506,448 | 5/1950 | Gregor | 62—237 |
| 2,900,045 | 8/1959 | Conklin | 186—1 |
| 3,058,320 | 10/1962 | Foster | 62—302 |

SAMUEL F. COLEMAN, *Primary Examiner.*

ANDRES H. NIELSEN, *Examiner.*